(12) United States Patent
Hasegawa et al.

(10) Patent No.: US 6,606,440 B2
(45) Date of Patent: Aug. 12, 2003

(54) MICROSTRUCTURED OPTICAL FIBER

(75) Inventors: Takemi Hasegawa, Yokohama (JP); Eisuke Sasaoka, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/842,053

(22) Filed: Apr. 26, 2001

(65) Prior Publication Data

US 2002/0001445 A1 Jan. 3, 2002

Related U.S. Application Data

(60) Provisional application No. 60/246,766, filed on Nov. 9, 2000.

(30) Foreign Application Priority Data

May 15, 2000 (JP) ..................................... P2000-142119

(51) Int. Cl.[7] ................................................ G02B 6/02
(52) U.S. Cl. ....................... 385/125; 385/123; 385/124; 385/126; 385/127
(58) Field of Search ................................ 385/123, 124, 385/125, 126, 127

(56) References Cited

U.S. PATENT DOCUMENTS

| | | |
|---|---|---|
| 4,139,262 A | 2/1979 | Mahlein et al. |
| 5,448,674 A | 9/1995 | Vengsarkar et al. |

(List continued on next page.)

FOREIGN PATENT DOCUMENTS

| | | | |
|---|---|---|---|
| EP | 0 621 496 A | 10/1994 | |
| GB | 2190741 A | * 11/1987 | ............ G02B/6/02 |
| JP | WO 01/63328 | 8/2001 | |

OTHER PUBLICATIONS

"Guiding Optical Light in Air Using an All–Dielectric Structure", Yoel Fink et al., Journal of Lightwave Technology, vol. 17, No. 11 Nov. 1999, pp. 2039–2041.

"Single–Mode Photonic Band Gap Guidance of Light in Air", R.F. Cregan et al., Science, vol. 285, Sep. 3, 1999, pp. 1537–1539.

"Monomode Photonic Band Gap Fibers for Dispersion Shifting Towards Short Wavelengths", J. Marcou et al., ECOC '99, Sep. 26–30, 1999, pp. 1–24–1–25.

"Singlemode propagation into depressed–core–index photonic–bandgap fibre, designed for zero–dispersion propagation at short wavelengths", F. Brecht et al., Electronics Letters, vol. 36, No. 6, Mar. 16th, 2000, pp. 514–515.

Broeng J et al: "Photonic Crystal Fibers: A New Class of Optical Waveguides" Optical Fiber Technology, Academic Press, London, US, vol. 5, No. 3, Jul. 1999, pp. 305–330, XP001023773 ISSN: 1068–5200 figure 16 p. 323–p. 243.

J.Marcou et. al.: "Monomode photonic band gap fibers for dispersion shifting towards short wavelengths" 25th European Conference on Optical Communication, vol. 1, Sep. 27–28, 1999, pp. 24–25, XP002189996 cited in the application the whole document.

*Primary Examiner*—Akm Enayet Ullah
*Assistant Examiner*—Jennifer Doan
(74) *Attorney, Agent, or Firm*—McDermott, Will & Emery

(57) ABSTRACT

In an optical fiber having a core region and a cladding region which surrounds the core region, wherein a plurality of regions made of sub mediums having refractive index different from that of the main medium constituting the cladding region are spaced apart in cross section of the cladding region and the mean refractive index of the core region is lower than that of the cladding region, the sub-medium regions are regularly arranged in the radial direction of said optical fiber such that the light having given wavelength, propagation coefficient and electric field distribution propagates along the fiber axis and has not less than 50% of a total propagating power in the core region, and this arrangement does not have translational symmetry in cross section.

12 Claims, 7 Drawing Sheets

U.S. PATENT DOCUMENTS

| | | |
|---|---|---|
| 5,742,722 A | 4/1998 | Imoto |
| 5,802,236 A | 9/1998 | DiGiovanni et al. ........ 385/127 |
| 6,243,522 B1 * | 6/2001 | Allan et al. ................. 385/123 |
| 6,301,421 B1 * | 10/2001 | Wickham et al. ........... 385/126 |
| 6,334,017 B1 * | 12/2001 | West ........................... 385/123 |
| 6,334,019 B1 * | 12/2001 | Birks et al. .................. 385/125 |
| 6,404,966 B1 * | 6/2002 | Kawanishi et al. ......... 385/125 |
| 6,463,200 B2 * | 10/2002 | Fink et al. ................... 385/123 |

* cited by examiner

MICROSTRUCTURED OPTICAL FIBER

CROSS-REFERENCE TO RELATED APPLICATION

This application claims priority to Provisional Application Ser. No. 60/246,766 filed Nov. 9, 2000, which is/are hereby incorporated by reference in its/their entirety.

BACKGROUND OF THE INVENTION

1. Field of the Invention

The present invention relates to an optical fiber suitable as an optical transmission path, a dispersion compensator, an optical filter, an optical power equalizer and an optical amplifier.

2. Description of the Related Art

Conventionally, optical fibers composed of alternately arranged annular layers of high and low refractive indices have been known and disclosed in J. Marcou, et al., "Monomode photonic band gap fibers for dispersion shifting towards short wavelengths" ECOC'99, I-pp.24–25 (hereinafter called D1) and Y. Fink, et al., "Guiding optical light in air using an all-dielectric structure" Journal of Lightwave Technology, vol.17, No.11, November, 1999 pp, 2039–2041 (hereinafter called D2).

In these optical fibers, light is confined in the center region, which is called the core region, surrounded by annular layers, which is called the cladding region. The refractive index of the core region is lower than the refractive indices of the annular layers in the cladding region. Accordingly, the confinement of light in the core is not based on total internal reflection but on Bragg reflection due to the regularity in the radial profile of refractive index. That is, a diverging cylindrical wave centered at the fiber axis is strongly coupled to a converging cylindrical wave centered at the fiber axis because of the regularity in the radial profile of refractive index in the cladding region. As a result, the diverging cylindrical wave is reflected by the annular layers in the cladding, and is confined in the core.

The thicknesses of the annular layers in the cladding are not necessarily uniform. In D1, the refractive index distribution is designed to have the periodicity based on the Bessel functions, while in the D2, the thicknesses of the layers are determined in accordance with the zero points of the Bessel functions.

Further, in R. F. Cregan, et al "Single-Mode photonic band gap guidance of light in air", Science, vol.285, pp.1537–1539 (September, 1999)(hereinafter called D3), an optical fiber having a cross-sectional structure in which a defect is introduced in a refractive index periodic structure having a two-dimensional translational symmetry is disclosed. In the cross section of this optical fiber, small regions (cells) having given refractive index distribution are regularly arranged, and some of the cells are replaced with cells having different refractive index distribution, resulting in breaking of the translational symmetry of the cross-sectional refractive index distribution. Those symmetry-breaking cells are called defects.

The two-dimensional periodic structure of the refractive index, if properly designed, reflects light belonging to a given wavelength band regardless of angle of incidence. Such a wavelength band is called a full PBG (full Photonic Band Gap). The light having the wavelength within the PBG is confined in the defect in the periodic structure. The periodic structure and the defect extend along the fiber axis and hence, the light propagates along the fiber axis.

Further, U.S. Pat. No. 5,802,236 discloses an optical fiber which includes a core and a cladding, wherein the effective refractive index of the core is higher than the effective refractive index of the cladding and the cladding has cladding feature structures which are arranged non-periodically. In such an optical structure, since the effective refractive index of the core is higher than the effective refractive index of the cladding, the light is confined in the core by total internal reflection. Here, assuming that a non-uniform region having spatially varying refractive index can be replaced with a homogeneous medium with maintaining the same optical characteristics, the effective refractive index is defined as the refractive index of such a homogeneous medium.

It is also conventionally known that Bragg reflection mirror can be formed by regularly laminating planar thin films consisting of media having different refractive indices, and that a high reflection efficiency is achieved by meeting the quarter wavelength condition where the optical thicknesses of the thin films are equal to a quarter wavelength.

SUMMARY OF THE INVENTION

However, in the optical fiber disclosed in D1, the refractive index difference between neighboring two annular layers is small (relative refractive index difference being 0.5%) because it is formed by doping Ge into silica glass.

Accordingly, the reflection efficiency of the annular layers in the cladding becomes small, and hence optical confinement to the core becomes weak. As a result, the optical power leaks to the outside of the fiber so that the transmission loss, particularly the transmission loss due to the bending of the fiber, increases.

On the other hand, in the optical fiber described in D2, the cladding region is composed of tellurium (refractive index being 4.6) and polystyrene (refractive index being 1.59). Due to the large difference in refractive index between the media, a high reflection efficiency can be obtained. However, the fabrication of this optical fiber is difficult for the following reason. According to the fabrication method disclosed in D2, this optical fiber is obtained by alternately depositing a tellurium film having a thickness of approximately 0.8 $\mu$m and a polystyrene film having a thickness of approximately 1.6 $\mu$m on an outer periphery of a glass tube of a diameter of 1.92 mm. However, it is difficult to fabricate a long fiber uniformly by this method. This is because if the optical fiber is wound in a coil while the films are deposited on it, it is difficult to deposit the films with uniform thickness. On the other hand, if the fiber is not wound in a coil shape, it is difficult to fabricate a long fiber because the length is limited by the size of the depositing facility. For example, the fiber length which is reported in the above-mentioned literature is as short as 10 cm. Further, since the films are deposited on a cylindrical surface, the control of the film thickness is difficult compared with the conventional thin film forming where the films are deposited on a planar surface. This also makes it difficult to fabricate a fiber which is uniform along its axis.

Further, in the optical fiber described in D3, the size of the defect is limited to integer times of the size of the cells of the periodic structure in the cross-sectional refractive index distribution. Accordingly, the size of the core is also limited to integer times of the size of the cells. The diameter of the core affects the number of guided modes and the degree of the optical confinement of the guided modes. Accordingly, the limited range of selection of the core diameter results in the limited range of achievable optical characteristics of the optical fiber. Particularly, it becomes difficult to deliberately control the wavelength range for single-mode operation and the tolerance to bending.

The present invention has been made in view of the above and it is an object of the present invention to provide an optical fiber based on confinement by Bragg reflection which exhibits strong optical confinement to the core, facilitates the fabrication of a long fiber, and realizes a high freedom in selection of the core diameter.

To achieve such an object, the optical fiber according to the present invention is the optical fiber consisting of a core region and a cladding region which surrounds the core region and has a plurality of regions spaced apart in cross section and made of sub mediums, whose refractive indices differ from that of a main medium constituting the cladding region, wherein the core region has lower mean refractive index than that of the cladding region, and wherein the arrangement of the regions made of sub mediums has such a regularity in the radial direction of the optical fiber that the light with given wavelength, propagation coefficient and electric field distribution propagates along the fiber axis and has not less than 50% of its total propagating power in the core region, and the arrangement does not have translational symmetry in cross section.

The main medium is a medium which can practicably constitute the optical fiber by itself and the main medium region must not be divided in a single optical fiber. On the other hand, the sub medium may be a medium which cannot constitute the optical fiber by itself. For example, the main medium may be silica glass and the sub medium may be gas or may be evacuated.

The mean refractive index $n_{avg}$ of a given circular annular region is defined by the following equation $$n_{avg} = \sqrt{\frac{1}{\pi(b^2-a^2)}\int_a^b \oint n^2(r,\theta)d\theta r dr} \quad (1)$$

where "a" and "b" are respectively the inner radius and the outer radius of the circular annular region, and r and $\theta$ are polar coordinates in the cross section and n (r, $\theta$) is a function giving the refractive index at the position (r, $\theta$).

According to the present invention, by arranging the sub mediums with a regularity in the radial direction of the fiber, it becomes possible to regularly change the mean refractive index in the radial direction in the cladding region. Eventually, it becomes possible to confine the light in the core by Bragg reflection. Moreover the use of the sub medium enables grater change in the mean refractive index than the conventional doped-glass technique and can realize stronger optical confinement to the core than the conventional technique.

Further, since the arrangement of the sub mediums does not have translational symmetry, the core diameter is not limited to integer times of the cell size. The great freedom in selecting the core diameter makes it possible to optimize the number of guided modes and the strength of the optical confinement of guided mode.

The translational symmetry of an arrangement is a property that the arrangement stays substantially unvaried when it is moved in a given direction by a given distance. Here, the vector specifying the direction and the distance of such movement operation is called a lattice vector. Further, the two-dimensional translational symmetry of an arrangement is a property that the arrangement has two independent lattice vectors.

It is preferable that the regions made of sub mediums are substantially arranged on one or more concentric circumferences centered at the fiber axis in the cross section of the fiber. Due to such a constitution, the mean refractive index of an annular region containing one of the circumferences on which the sub mediums are arranged can be made greatly different from that of the neighboring annular regions, and hence strong optical confinement can be realized.

Alternately, it is preferable that the cladding region consists of a plurality of concentric cylindrical regions, where regions having high and low mean refractive indices are arranged alternately in the radial direction.

In this manner, by alternating the high mean refractive index regions and the low mean refractive index regions, a mode coupling is generated between cylindrical lightwaves propagating outward and inward so that it becomes possible to reflect the cylindrical lightwave propagating outward efficiently and confine it to the core region.

It is preferable that respective optical thicknesses of respective cylindrical regions effectively equal to the quarter wavelength of the given mode optical wave. Here, "optical thicknesses effectively equal to the quarter wavelength" means a condition where the diagonal components of the characteristic matrix Mi expressed below become substantially zero.

$$Mi = \begin{bmatrix} m_{11} & m_{12} \\ m_{21} & m_{22} \end{bmatrix} = \frac{\pi \kappa_i \sqrt{a_{i-1} a_i}}{-2} \times \begin{bmatrix} J_v(i-1)N_{v+1}(i) - J_{v+1}(i)N_v(i-1) & -\eta_i^{-1}\{J_v(i-1)N_v(i) - J_v(i)N_v(i-1)\} \\ \eta_i\{J_{v+1}(i-1)N_{v+1}(i) - J_{v+1}(i)N_{v+1}(i-1)\} & J_v(i)N_{v+1}(i-1) - J_{v+1}(i-1)N_v(i) \end{bmatrix}$$

where, $a_{i-1}$ is the inner radius of the i-th cylindrical region, $a_i$ is the outer radius of the i-th cylindrical region and $\kappa_i$ is the propagation constant in the radial direction in the i-th cylindrical region which is defined as follows.

$$\kappa_i = \sqrt{n_i^2 k_0^2 - \beta^2}$$

where, $n_i$ is the refractive index of the i-th cylindrical region, $k_0$ is the wave number in vacuum, and $\beta$ is the a propagation constant in the axial direction. Further, $\eta_i$ is the effective refractive index of the i-th cylindrical region, wherein $\eta_i = -k_0/\kappa_i$ for TE mode $\eta_i = k_0 n_i^2/\kappa_i$ for TM mode $\eta_i \approx -\kappa_i/\beta$ for $LP_{01}$ mode Further, $J_v$ and $N_v$ are the first-kind and second-kind Bessel functions of the v-th order respectively. Also, $J_v(\kappa_i a_i)$ is expressed as $J_v(i)$, $N_v(\kappa_i a_i)$ is expressed as $N_v(i)$, $J_v(\kappa_i a_{i-1})$ is expressed as $J_v(i-1)$ and $N_v(\kappa_i a_{i-1})$ is expressed as $N_v(i-1)$.

Although, it is in some cases difficult to make both of the diagonal components of Mi exactly equal to zero, the inventors have found out that it is sufficient for tight confinement of light to the core to make the diagonal components $m_{11}$ and $m_{22}$ substantially equal to zero alternately, that is, to make $m_{11}$ substantially equal zero in the i-th region, $m_{22}$ substantially equal to zero in the (i+1)-th region, and so forth. Such a condition to achieve high reflectivity in the cladding and tight confinement of light to the core is called a pseudo quarter wavelength condition.

By forming the core region by a void or silica glass, the transmission loss can be reduced. Further, by making the core of an optical gain medium, an optical amplifier having the gain characteristics with small dependency on wavelength can be realized. In a constitution where the core region is composed of an inner core region and an outer core region which surrounds the inner core region and has the refractive index lower than the refractive index of the inner core region, it becomes possible to reduce the bending loss in the basic mode without deteriorating the cut-off characteristics of higher order modes.

This optical fiber can be suitably used as a band-pass optical filter and a gain equalizer. Also, an optical transmission path can be constituted by such an optical fiber and another optical fiber whose dispersion is of the opposite sign to that of such an optical fiber.

DESCRIPTION OF THE PREFERRED EMBODIMENTS

Figure 1:
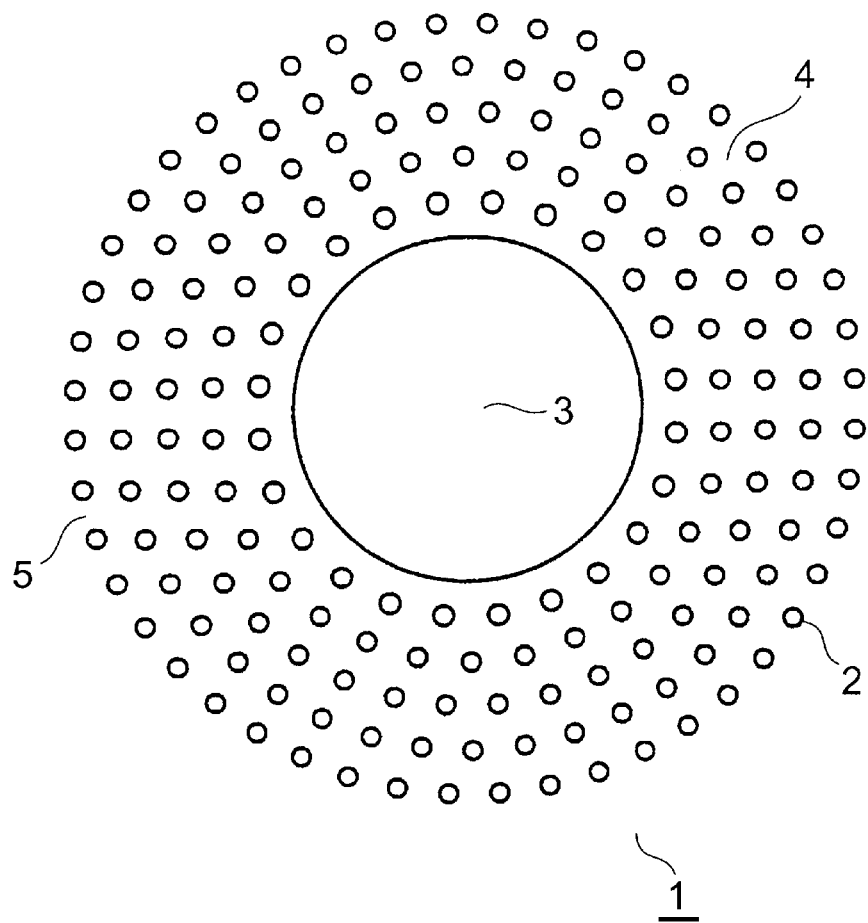
FIG. 1 is a cross-sectional view showing a basic constitution of an optical fiber according to the present invention.

Preferred embodiments of the present invention are explained in detail hereinafter in conjunction with attached drawings. To facilitate the comprehension of the explanation, the same reference numerals denote the same parts, where possible, throughout the drawings, and a repeated explanation will be omitted.

First Embodiment

FIG. 1 is a transverse cross-sectional view showing the basic constitution of an optical fiber 1 according to the present invention. As shown in FIG. 1, the optical fiber 1 has a cross-sectional structure which arranges Nk pieces of voids 2 equidistantly on circumferences having radii Rk (k=0 . . . M) centered on a fiber axis. The voids arranged on a circumference of a radius of Rk have substantially the same diameter dk. FIG. 1 shows a part of the cross-sectional structure corresponding to k=0, . . . , 5. In the optical fiber 1 shown in FIG. 1, the number M of the voids 2 in the radial direction is set to M=9 and Rk, dk, Nk respectively take values shown in Table 1.

A void (cavity) having a diameter of 6.05 $\mu$m which is positioned at the center of the optical fiber 1 corresponds to the core 3 and a region around the core 3 constitutes a cladding region 5 formed of silica glass 4 and the voids 2. The cladding region 5 consists of circular annular regions having a high mean refractive index and a low mean refractive index alternately stacked in the radial direction. The refractive indices of the silica glass 4 and the voids 2 are respectively 1.444 and 1 at a wavelength of 1550 nm.

Figure 2:
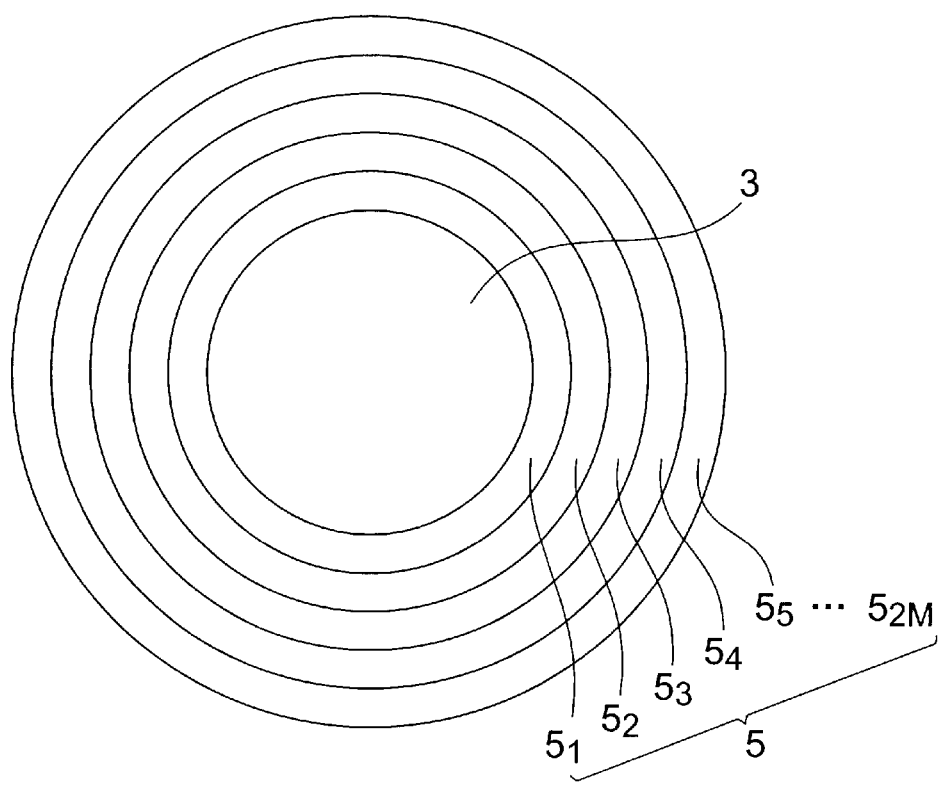
FIG. 2 is a view which schematically shows the structure.

With a plurality of voids 2 which are arranged on the concentric circumferences centered on the fiber axis, the cladding region 5 has a structure in which the circular annular regions having the high mean refractive index and the circular annular regions having the low mean refractive index are alternately laminated in the radial direction. FIG. 2 shows this mode in a schematic manner. Here, the circular annular regions $5k$ (k=1, . . . , 2M) are numbered from the inner side to the outer side. The circular annular regions with odd number $5_1, 5_3, 5_5, 5_{2M-1(=17)}$ do not include voids 2 and consists only of silica glass 4. Accordingly, the refractive indices of these circular annular regions are all equal to 1.444 at the wavelength of 1550 nm.

On the other hand, in the circular annular regions with even number $5_2, 5_4, 5_6, 5_{2M(=18)}$, which are disposed between the circular annular regions with odd number $5_1, 5_3, 5_5, 5_{2M-1(=17)}$, the voids 2 are disposed at an interval along circumferences each of which is centered at the fiber axis and has a radius equal to the mean of the inner and outer radii of the circular annular region. The thicknesses of the circular annular regions are all 0.40 $\mu$m. The mean refractive indices of these regions are all 1.350 at a wavelength of 1550 nm, according to equation (1). Accordingly, the even-numbered circular annular regions have the lower mean refractive indices than the odd-numbered circular annular regions.

The propagation constant $\kappa$ in the radial direction, the phase thickness $\delta$ and the diagonal components $m_{11}$, $m_{22}$ of the characteristic matrix at a wavelength of 1550 nm of the core region 1 and respective circular annular regions $5_1$ to $5_{18}$ are shown in Table 2. Denoting the physical thickness of the layer as t, the phase thickness is defined by $\delta = \kappa t$.

TABLE 2

Structural parameters of respective regions of the optical fiber of the embodiment 1

| | $\kappa$ | $\delta$ | $m_{11}$ | $m_{22}$ |
|---|---|---|---|---|
| Core region 1 | 1.26 | 3.81 | | |
| Circular annular region $5_1$ | 4.41 | 1.61 | $3 \times 10^{-3}$ | $-4 \times 10^{-5}$ |
| Circular annular region $5_2$ | 3.89 | 1.55 | $8 \times 10^{-4}$ | $-2 \times 10^{-3}$ |
| Circular annular region $5_3$ | 4.41 | 1.60 | $2 \times 10^{-3}$ | $-2 \times 10^{-5}$ |
| Circular annular region $5_4$ | 3.89 | 1.55 | $4 \times 10^{-4}$ | $-2 \times 10^{-3}$ |
| Circular annular region $5_5$ | 4.41 | 1.59 | $1 \times 10^{-3}$ | $-5 \times 10^{-5}$ |

TABLE 1

Arrangement of voids 2 in the optical fiber of the first embodiment.

| k | 0 | 1 | 2 | 3 | 4 | 5 | 6 | 7 | 8 | 9 |
|---|---|---|---|---|---|---|---|---|---|---|
| Rk [$\mu$m] | 0 | 3.59 | 4.35 | 5.12 | 5.88 | 6.64 | 7.39 | 8.15 | 8.91 | 9.67 |
| dk [$\mu$m] | 6.05 | 0.340 | 0.335 | 0.332 | 0.329 | 0.327 | 0.326 | 0.325 | 0.324 | 0.323 |
| Nk | 1 | 24 | 30 | 36 | 42 | 48 | 54 | 60 | 66 | 72 |

TABLE 2-continued

Structural parameters of respective regions of
the optical fiber of the embodiment 1

|  | κ | δ | $m_{11}$ | $m_{22}$ |
|---|---|---|---|---|
| Circular annular region $5_6$ | 3.88 | 1.55 | $3 \times 10^{-4}$ | $-1 \times 10^{-3}$ |
| Circular annular region $5_7$ | 4.41 | 1.59 | $1 \times 10^{-3}$ | $-1 \times 10^{-4}$ |
| Circular annular region $5_8$ | 3.89 | 1.55 | $1 \times 10^{-4}$ | $-1 \times 10^{-3}$ |
| Circular annular region $5_9$ | 4.41 | 1.58 | $7 \times 10^{-4}$ | $-2 \times 10^{-4}$ |
| Circular annular region $5_{10}$ | 3.89 | 1.56 | $1 \times 10^{-4}$ | $-8 \times 10^{-4}$ |
| Circular annular region $5_{11}$ | 4.41 | 1.58 | $5 \times 10^{-4}$ | $-2 \times 10^{-4}$ |
| Circular annular region $5_{12}$ | 3.89 | 1.56 | $7 \times 10^{-5}$ | $-7 \times 10^{-4}$ |
| Circular annular region $5_{13}$ | 4.41 | 1.58 | $4 \times 10^{-4}$ | $-2 \times 10^{-4}$ |
| Circular annular region $5_{14}$ | 3.88 | 1.55 | $-2 \times 10^{-5}$ | $-7 \times 10^{-4}$ |
| Circular annular region $5_{15}$ | 4.41 | 1.58 | $3 \times 10^{-4}$ | $-1 \times 10^{-4}$ |
| Circular annular region $5_{16}$ | 3.89 | 1.56 | $-9 \times 10^{-6}$ | $-5 \times 10^{-4}$ |
| Circular annular region $5_{17}$ | 4.41 | 1.58 | $3 \times 10^{-4}$ | $-9 \times 10^{-5}$ |
| Circular annular region $5_{18}$ | 3.88 | 1.55 | $-5 \times 10^{-5}$ | $-5 \times 10^{-4}$ |

As shown in Table. 2, the phase thicknesses δ of respective layers substantially correspond to π/2, and the diagonal components of the characteristic matrix $m_{11}$ and $m_{22}$ become substantially zero in the even-numbered and odd-numbered circular annular regions, respectively, so that the pseudo quarter wavelength condition is satisfied. As a result, the cladding region 5 efficiently reflects cylindrical light-wave propagating outward and confines the lightwave to the core region 1. The present invention realizes higher reflectivity in the cladding than the conventional technique based on Ge-doped silica because the mean refractive index difference between the even-numbered circular annular regions with a plurality of voids and the odd-numbered circular annular regions without voids is as high as 6.7%, which could not be realized by the conventional technique.

The optical fiber according to this embodiment can be fabricated by a fiber drawing step in which one end of a fiber preform is heated and drawn to form the optical fiber. As a result, compared with the conventional technique in which fiber is made by deposition, optical fiber can be fabricated to a long length and with a good uniformity along the length. For example, by drawing a preform with a diameter of 20 mm and a length of 300 mm, optical fiber with a diameter of 125 μm can be fabricated to a length of 7.6 km.

The core diameter, which is set to 6.05 μm in this embodiment, is not limited by the regularity on the cladding structure. This is the difference from the conventional full PBG guided-type optical fiber in which the core diameter is restricted to integer times of the cell diameter. The optical fiber of this embodiment can provide a wide selection range of core diameter. As a result, it becomes possible to control the strength of confinement of light and the number of modes.

Further, by alternating the circular annular regions having high and low mean refractive indices in the radial direction, efficient mode coupling is realized between cylindrical light-waves propagating outward and inward, whereby it becomes possible to reflect the cylindrical lightwave propagating outward and confine the lightwave to the core.

Figure 3:
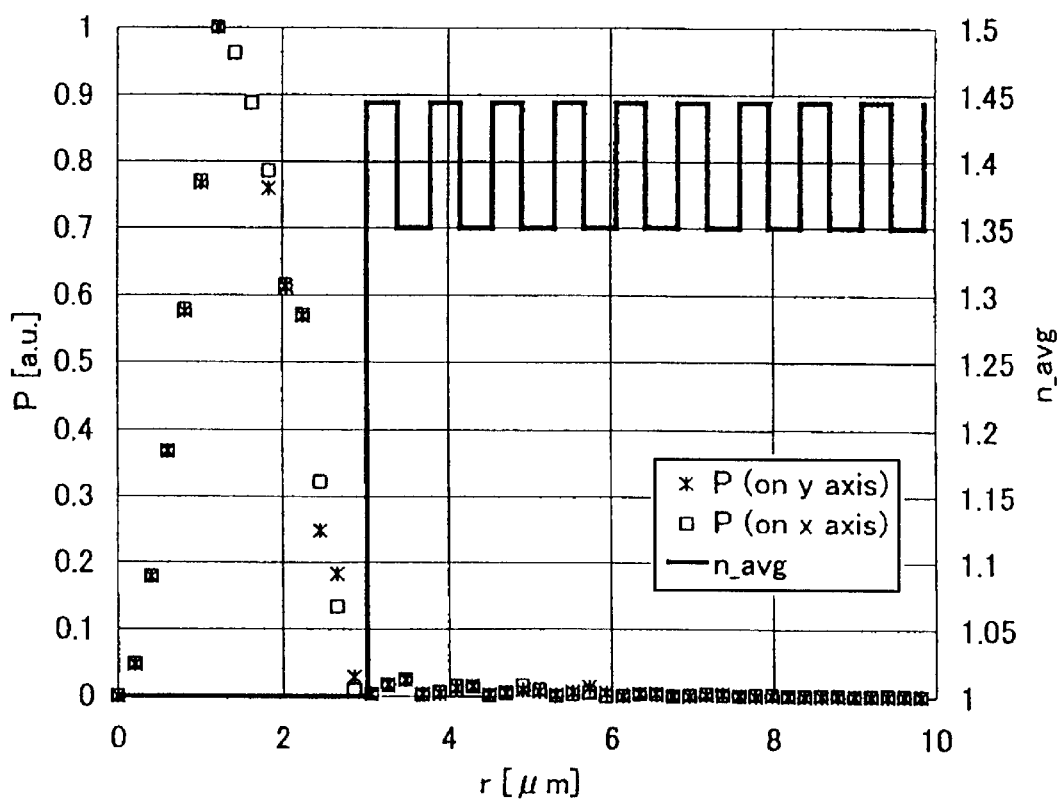
FIG. 3 and FIG. 4 are figures showing the simulation results of the first embodiment and second embodiment, respectively.

FIG. 3 shows the simulation result with respect to the optical power distribution in the radial direction together with the distribution of the mean reflective index $n_{avg}$ in the optical fiber 1. The optical fiber 1 has the guided mode at a wavelength of 1550 nm and the mode reflective index $n_{eq}$ of the guided mode is 0.9507. Further, the electric field distribution of the guided mode is similar to the TE mode electric field distribution in a step-index type optical fiber. That is, an electric field vector is aligned along the circumferential direction with respect to the fiber axis.

In FIG. 3, the distribution of optical power P in the radial direction in the cross section is shown with respect to two directions consisting of an arbitrary X direction and a Y direction which is perpendicular to the X direction. The position in the radial direction is denoted as r. It is understood that the optical power is confined in the core due to the regular structure of the mean refractive index. Here, not less than 90% of the total propagation power propagates through the core. Since the core 3 consists of a void in this optical fiber, the optical fiber exhibits such characteristics as low transmission loss, low non-linearity and low material dispersion. Further, since the cladding region 5 consists of the silica glass 4 and the voids 2, the transmission loss in the cladding region can be also reduced.

In this manner, with the use of the materials having low optical losses as the main medium and the sub medium of the cladding region, the optical loss in the cladding region can be reduced.

Further, when the core consists of a void, it becomes possible to fill air or an inert gas (Ar or the like) in the core or to evacuate the core 3, whereby, an optical transmission path having low transmission loss can be realized. Using air, inert gas or vacuum state as the core 3, the non-linear optical effects can be made negligible so that the deterioration of the transmission quality due to the non-linear optical effects can be suppressed whereby an optical transmission path suitable for an optical communication of a long distance and a large capacity can be realized. Further, since the group velocity dispersion of the core material can be made negligible, the chromatic dispersion having a small absolute value can be realized, and hence an optical transmission path suitable for an optical communication of a long distance and a large capacity can be realized. Still further, since the non-linearity is low, even when the absolute value of the chromatic dispersion is small, the deterioration of the transmission quality due to four-wave mixing does not occur so that the wavelength division multiplexing can be performed and an optical communication of a large capacity can be realized.

Second Embodiment

In an optical fiber according to the second embodiment of the present invention, although the basic structure thereof is identical with that of the optical fiber of the first embodiment shown in FIG. 1 and FIG. 2, the number M of voids 2 in the radial direction is 8 and Rk, dk, Nk take values different from those of the first embodiment as shown in Table 3.

TABLE 3

Arrangement of voids 2 in the optical fiber of
the second embodiment

| K | 0 | 1 | 2 | 3 | 4 | 5 | 6 | 7 | 8 |
|---|---|---|---|---|---|---|---|---|---|
| Rk [μm] | 0 | 4.78 | 5.58 | 6.39 | 7.18 | 7.98 | 8.78 | 9.58 | 10.37 |
| Dk [μm] | 8.41 | 0.364 | 0.359 | 0.355 | 0.352 | 0.350 | 0.348 | 0.346 | 0.345 |
| Nk | 1 | 30 | 36 | 42 | 48 | 54 | 60 | 66 | 72 |

As in the case of the first embodiment, a void having a diameter of 8.41 μm which is positioned at the center of the fiber corresponds to a core 3 also in this embodiment.

In this embodiment also, circular annular regions $5_1$, $5_3$, $5_5$, ..., $5_{15}$ which consist only of silica glass 4 and have the high refractive index (1.444 at a wavelength of 1550 nm) and circular annular regions $5_2$, $5_4$, $5_6$, ..., $5_{16}$ which have voids 2 along a circumference which is centered at the fiber axis and has a radius equal to the mean of the inner and outer radii of the circular annular region, and have the low refractive index (1.350 at a wavelength of 1550 nm) are alternately arranged.

The propagation coefficients K, the phase thicknesses δ, the diagonal components $m_{11}$, $m_{22}$ of characteristic matrix of the core region 1 and respective circular annular regions $5_1$ to $5_{16}$ at a wavelength of 1550 nm are shown in Table 4.

TABLE 4

Structural parameters of respective regions of the optical fiber of the second embodiment.

| | κ | δ | $m_{11}$ | $m_{22}$ |
|---|---|---|---|---|
| Core region 1 | 0.52 | 2.18 | | |
| Circular annular region $5_1$ | 4.25 | 1.54 | $-7 \times 10^{-5}$ | $-2 \times 10^{-3}$ |
| Circular annular region $5_2$ | 3.71 | 1.60 | $2 \times 10^{-3}$ | $-2 \times 10^{-4}$ |
| Circular annular region $5_3$ | 4.25 | 1.55 | $-1 \times 10^{-5}$ | $-1 \times 10^{-3}$ |
| Circular annular region $5_4$ | 3.71 | 1.59 | $1 \times 10^{-3}$ | $-2 \times 10^{-4}$ |
| Circular annular region $5_5$ | 4.25 | 1.55 | $-1 \times 10^{-5}$ | $-1 \times 10^{-3}$ |
| Circular annular region $5_6$ | 3.71 | 1.59 | $1 \times 10^{-3}$ | $-1 \times 10^{-4}$ |
| Circular annular region $5_7$ | 4.25 | 1.55 | $-7 \times 10^{-5}$ | $-8 \times 10^{-4}$ |
| Circular annular region $5_8$ | 3.71 | 1.59 | $9 \times 10^{-4}$ | $-3 \times 10^{-5}$ |
| Circular annular region $5_9$ | 4.25 | 1.55 | $-4 \times 10^{-5}$ | $-7 \times 10^{-4}$ |
| Circular annular region $5_{10}$ | 3.71 | 1.58 | $6 \times 10^{-4}$ | $-1 \times 10^{-4}$ |
| Circular annular region $5_{11}$ | 4.25 | 1.56 | $-4 \times 10^{-6}$ | $-5 \times 10^{-4}$ |
| Circular annular region $5_{12}$ | 3.71 | 1.58 | $5 \times 10^{-4}$ | $-9 \times 10^{-5}$ |
| Circular annular region $5_{13}$ | 4.25 | 1.56 | $-3 \times 10^{-5}$ | $-4 \times 10^{-4}$ |
| Circular annular region $5_{14}$ | 3.71 | 1.58 | $4 \times 10^{-4}$ | $-7 \times 10^{-5}$ |
| Circular annular region $5_{15}$ | 4.25 | 1.56 | $-2 \times 10^{-5}$ | $-4 \times 10^{-4}$ |
| Circular annular region $5_{16}$ | 3.71 | 1.58 | $3 \times 10^{-4}$ | $-1 \times 10^{-4}$ |

As shown in Table 4, the phase thickness δ of each layer corresponds to approximately π/2, and, the diagonal components of characteristic matrix $m_{11}$ and $m_{22}$ becomes substantially zero in the odd-numbered and even-numbered circular annular regions, respectively, and hence the pseudo quarter wavelength condition is satisfied. Accordingly, the cladding region 5 can reflect cylindrical wave propagating outward and confine the lightwave to the core region 1 tightly.

Figure 4:
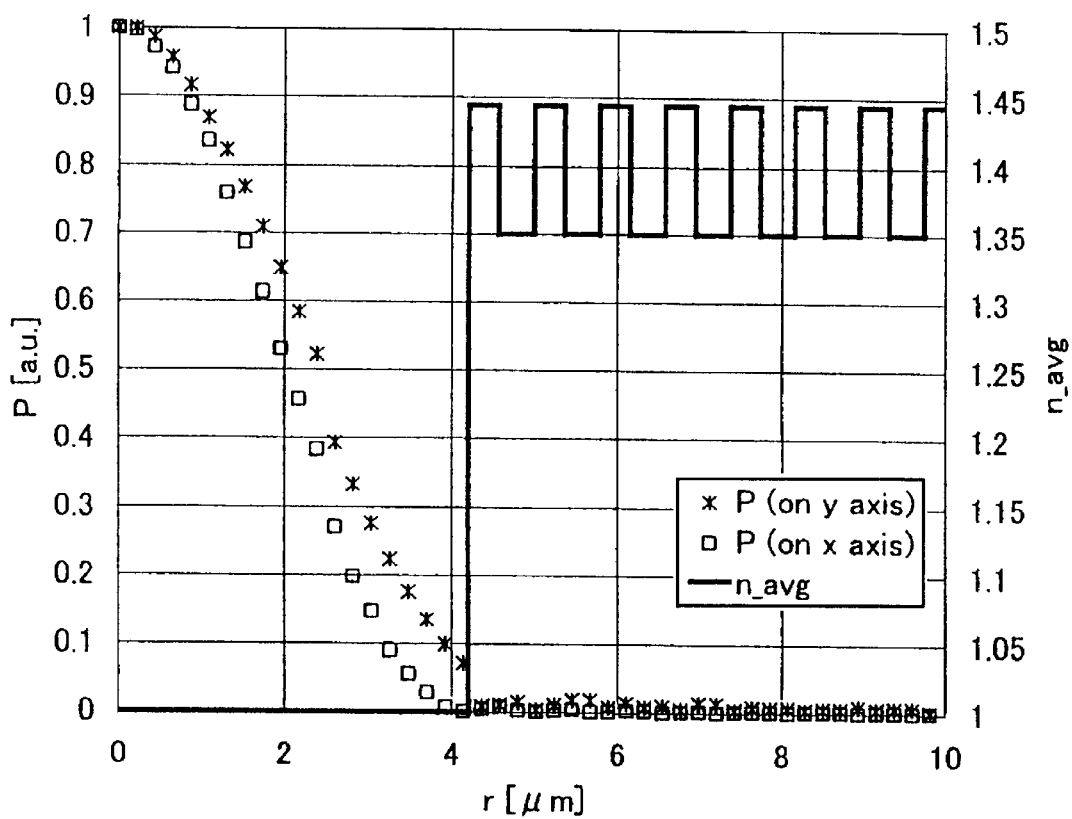

FIG. 4 shows the simulation result of the optical power distribution of the optical fiber 1 in the radial direction in the second embodiment together with the distribution of the mean refractive index $n_{avg}$. This optical fiber has a guided mode at a wavelength 1550 nm and the mode refractive index $n_{eq}$ of the guided mode is 0.9899. Further, the electric field distribution of the guided mode is similar to an LP01 mode electric field distribution of a step index type optical fiber. That is, the direction of the electric field is substantially uniform in the cross section. By taking this direction as a Y axis and a direction perpendicular to this direction in the cross section as an X axis, the distributions of optical power P along respective axes become as shown in FIG. 4. It is understood that the optical power is confined in the core due to the regular structure of the mean refractive indices. Here, not less than 90% of the total propagation power propagates through the core region.

In the optical fiber of this second embodiment also, since the core 3 consists of a void, the optical fiber has characteristics such as low optical loss, low non-linearity and low material dispersion. Further, since the cladding region 5 consists of the silica glass 4 and the voids 2, the optical loss is low and the reflectivity in the cladding region 5 is high. Further, since the main medium is silica glass and the sub medium is air, an optical fiber based on guiding by Bragg reflection can be easily fabricated to a long length and with a good uniformity by fiber drawing compared with conventional technique.

Figure 5:
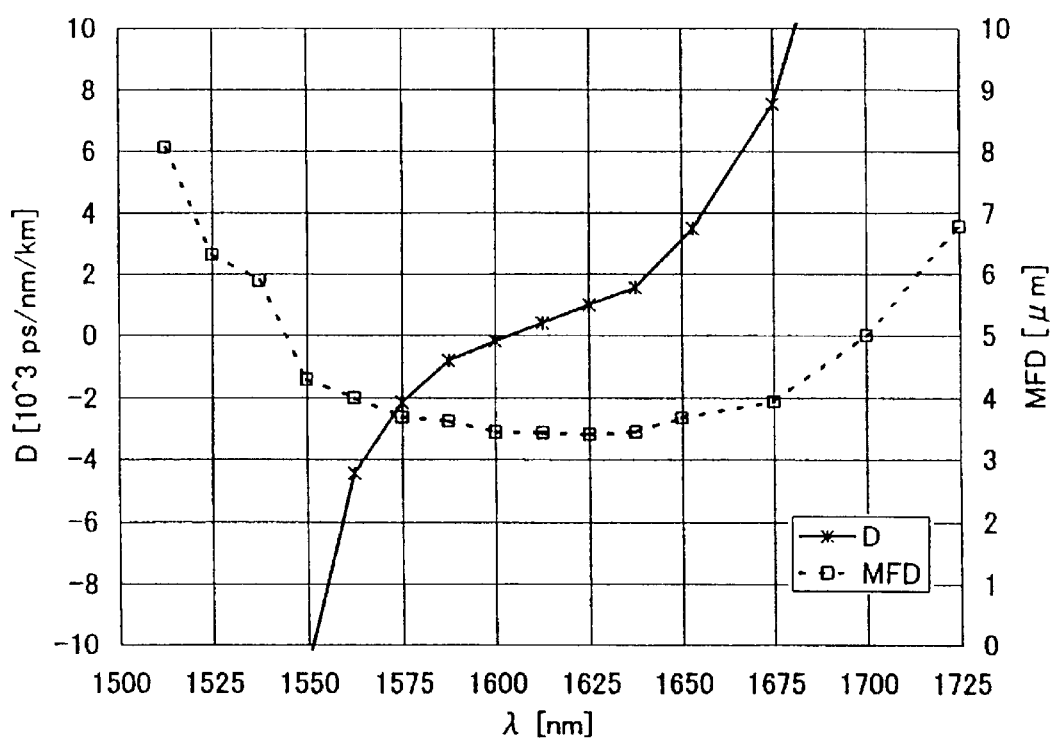
FIG. 5 is a figure showing characteristics of the chromatic dispersion D and the mode field diameter MFD to the wavelength $\lambda$ in the second embodiment.

FIG. 5 shows characteristics of the chromatic dispersion D and the mode field diameter MFD to wavelength λ of the optical fiber of this embodiment. The mode field diameter MFD takes the smallest value in the vicinity of the wavelength of 1600 nm, which means that the reflection wavelength band of the cladding region 5 is present around 1600 nm. Further, the mode field diameter MFD increases as the wavelength deviates from 1600 nm, which means that the pseudo quarter wavelength condition becomes less satisfied and optical confinement becomes weak as the wavelength deviates from the reflection wavelength band.

As optical confinement becomes weak, the optical loss due to the leakage of light to the outside of the fiber increases. Accordingly, with the deviation of the optical wavelength from the reflection wavelength band, the optical loss increases. As a result, it becomes possible to realize an optical filter which adopts the reflection wavelength band as transmission band and a gain equalizer using the wavelength dependency of the optical loss.

Further, as the optical wavelength deviates from the reflection wavelength band, the mode group refractive index increases, which results in increase in the absolute value of the chromatic dispersion. The chromatic dispersion and the chromatic dispersion slope become negative in the shorter wavelength side of the reflection wavelength band and positive in the longer wavelength side of the reflection wavelength band. Such characteristics of the optical fiber are suitable for the compensation of the chromatic dispersion and the chromatic dispersion slope of an optical transmission path.

Third Embodiment

An optical fiber of the third embodiment according to the present invention has a basic structure which is identical with those of the optical fibers of the first and second embodiments. However, in the third embodiment, the number M of voids 2 in the radial direction is 9 and Rk, dk and Nk take values different from those of the first and second embodiments as shown in Table 5.

TABLE 5

Arrangement of voids 2 in an optical fiber of the third embodiment.

| K | 0 | 1 | 2 | 3 | 4 | 5 | 6 | 7 | 8 | 9 |
|---|---|---|---|---|---|---|---|---|---|---|
| Rk [μm] | 0 | 5.38 | 7.84 | 10.29 | 12.73 | 15.17 | 17.61 | 20.04 | 22.47 | 24.90 |
| dk [μm] | 7.36 | 0.434 | 0.465 | 0.484 | 0.497 | 0.506 | 0.513 | 0.519 | 0.524 | 0.527 |
| Nk | 1 | 24 | 30 | 36 | 42 | 48 | 54 | 60 | 66 | 72 |

In contrast to the first and second embodiments, a circular region positioned at the center of the fiber is formed of pure silica glass and constitutes a core 3. The diameter of this circular region is 7.36 μm. A cladding region 5 surrounding the core 3 is composed of silica glass 4 doped with 30 mol % of Ge and voids 2. Refractive indices of the core 3, the Ge-doped silica glass 4 and the voids 2 at a wavelength of 1550 nm are respectively 1.444, 1.488 and 1.

In this embodiment also, circular annular regions $5_1$, $5_3$, $5_5$, ..., $5_{17}$ which consist only of Ge-doped silica glass 4 and has a high refractive index (1.488 at a wavelength of 1550 nm) and circular annular regions $5_2$, $5_4$, $5_6$, ..., $5_{18}$ having voids 2 along a circumference which is centered at the fiber axis and has a radius equal to the mean of the inner and outer radii of the circular annular region, and has a low refractive index (1.460 at a wavelength of 1550 nm) are alternately arranged.

The propagation coefficients κ in the radial direction, the phase thickness δ, the diagonal components $m_{11}$, $m_{22}$ of the characteristic matrix of the core region 1 and respective circular annular regions $5_1$ to $5_{18}$ at a wavelength of 1550 nm are shown in Table 6.

TABLE 6

Structural parameters of respective regions of the optical fiber of the third embodiment.

| | κ | δ | $m_{11}$ | $m_{22}$ |
|---|---|---|---|---|
| Core region 1 | 0.62 | 2.29 | | |
| Circular annular region $5_1$ | 1.59 | 1.49 | $-1 \times 10^{-3}$ | $-2 \times 10^{-3}$ |
| Circular annular region $5_2$ | 1.07 | 1.63 | $2 \times 10^{-2}$ | $-4 \times 10^{-3}$ |
| Circular annular region $5_3$ | 1.59 | 1.51 | $-6 \times 10^{-4}$ | $-6 \times 10^{-3}$ |
| Circular annular region $5_4$ | 1.07 | 1.60 | $7 \times 10^{-3}$ | $-2 \times 10^{-3}$ |
| Circular annular region $5_5$ | 1.59 | 1.53 | $-5 \times 10^{-4}$ | $-4 \times 10^{-3}$ |
| Circular annular region $5_6$ | 1.07 | 1.59 | $4 \times 10^{-3}$ | $-2 \times 10^{-3}$ |
| Circular annular region $5_7$ | 1.59 | 1.53 | $-4 \times 10^{-4}$ | $-2 \times 10^{-3}$ |
| Circular annular region $5_8$ | 1.07 | 1.58 | $2 \times 10^{-3}$ | $-1 \times 10^{-3}$ |
| Circular annular region $5_9$ | 1.59 | 1.54 | $-3 \times 10^{-4}$ | $-2 \times 10^{-3}$ |
| Circular annular region $5_{10}$ | 1.07 | 1.57 | $1 \times 10^{-3}$ | $-1 \times 10^{-3}$ |
| Circular annular region $5_{11}$ | 1.59 | 1.54 | $-3 \times 10^{-4}$ | $-1 \times 10^{-3}$ |
| Circular annular region $5_{12}$ | 1.07 | 1.57 | $9 \times 10^{-4}$ | $-9 \times 10^{-4}$ |
| Circular annular region $5_{13}$ | 1.59 | 1.54 | $-2 \times 10^{-4}$ | $-9 \times 10^{-4}$ |
| Circular annular region $5_{14}$ | 1.07 | 1.56 | $4 \times 10^{-4}$ | $-9 \times 10^{-4}$ |
| Circular annular region $5_{15}$ | 1.59 | 1.55 | $-2 \times 10^{-4}$ | $-7 \times 10^{-4}$ |
| Circular annular region $5_{16}$ | 1.07 | 1.56 | $3 \times 10^{-4}$ | $-8 \times 10^{-4}$ |
| Circular annular region $5_{17}$ | 1.59 | 1.55 | $-2 \times 10^{-4}$ | $-6 \times 10^{-4}$ |
| Circular annular region $5_{18}$ | 1.07 | 1.56 | $2 \times 10^{-4}$ | $-7 \times 10^{-4}$ |

As shown in Table 6, the phase thickness δ of each layer corresponds to approximately π/2, and the diagonal components of the characteristic matrix $m_{11}$ and $m_{22}$ become substantially zero in the odd-numbered and even-numbered circular annular regions, respectively, and hence the pseudo quarter wavelength condition is satisfied. Accordingly, the cladding region 5 can efficiently reflect cylindrical lightwave propagating outward and confine the lightwave to the core tightly.

Figure 6:
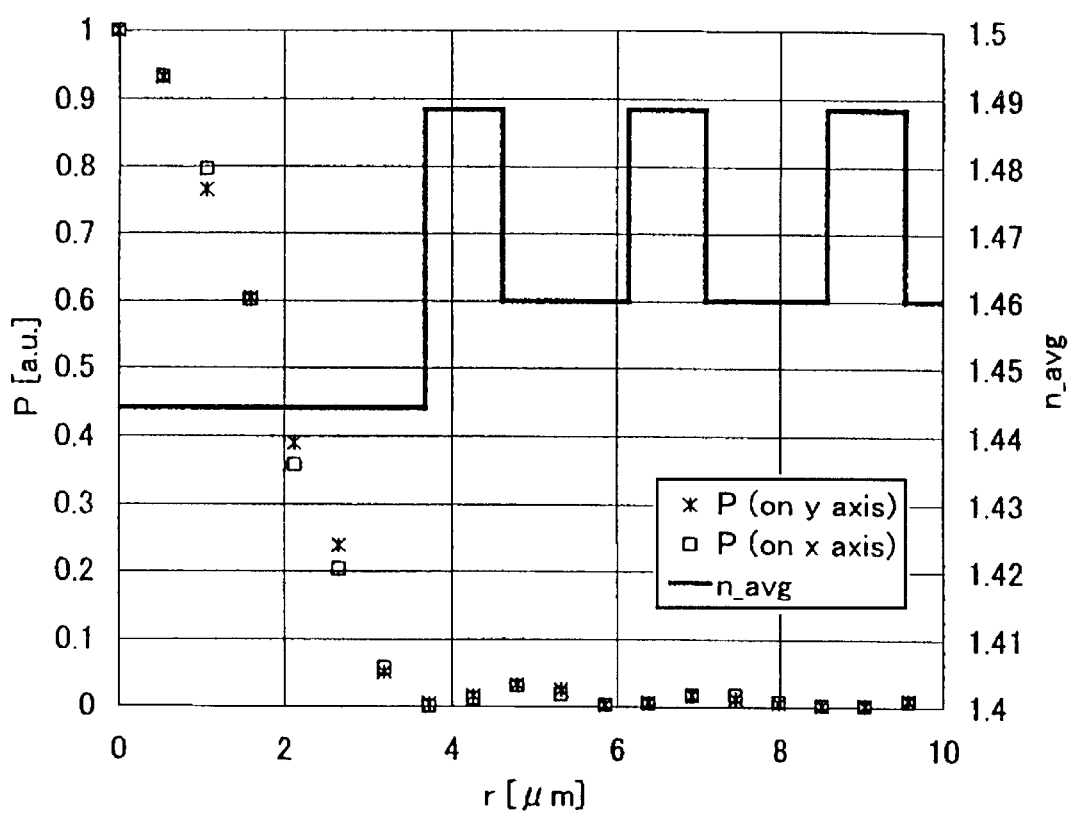
FIG. 6 is a figure showing the simulation result of the third embodiment.

FIG. 6 shows the simulation result of distribution of the optical power P in the radial direction in the optical fiber 1 of the third embodiment together with the distribution of the mean refractive index $n_{avg}$. This optical fiber has a guided mode at a wavelength 1550 nm and the mode refractive index $n_{eq}$ of the guided mode is 1.4359. Further, the electric field distribution of the guided mode is similar to an LP01 mode electric field distribution of a step index type optical fiber. That is, the direction of the electric field is substantially uniform in the cross section. By taking this direction as Y axis and the direction perpendicular to this direction in the cross section as X axis, optical power distributions along respective axes are shown in FIG. 6. It is understood that the optical power is confined in the core due to the regular structure of the mean refractive indices. Here, not less than 90% of the total propagation power propagates through the core region.

In the optical fiber of this third embodiment also, since the core 3 is silica glass, low optical loss can be realized. Further, since the cladding region 5 consists of silica based glass 4 and voids 2, the optical loss is low and the reflectivity of the cladding region 5 is high. Further, since the main medium is silica based glass and the sub medium is air, an optical fiber based on guiding by Bragg reflection can be fabricated to a long length and a good uniformity along the length by fiber drawing compared with the conventional technique which makes fiber by deposition.

Further, in this optical fiber, by doping an element such as Er into at least a part of the core, the core can be formed into an optical gain medium. Usually, the gain in the optical gain medium has a wavelength dependency. In the optical fiber of this third embodiment, the optical loss depends on the wavelength as in the case of the optical fiber of the second embodiment. Accordingly, by designing the wavelength dependency of the optical loss so that it cancels the wavelength dependency of the gain characteristics, the gain characteristics with small wavelength dependency can be realized. As a result, an optical amplifier having the gain characteristics with small wavelength dependency which is suitable for an optical communication of a long distance and a large capacity can be realized.

Figure 7:
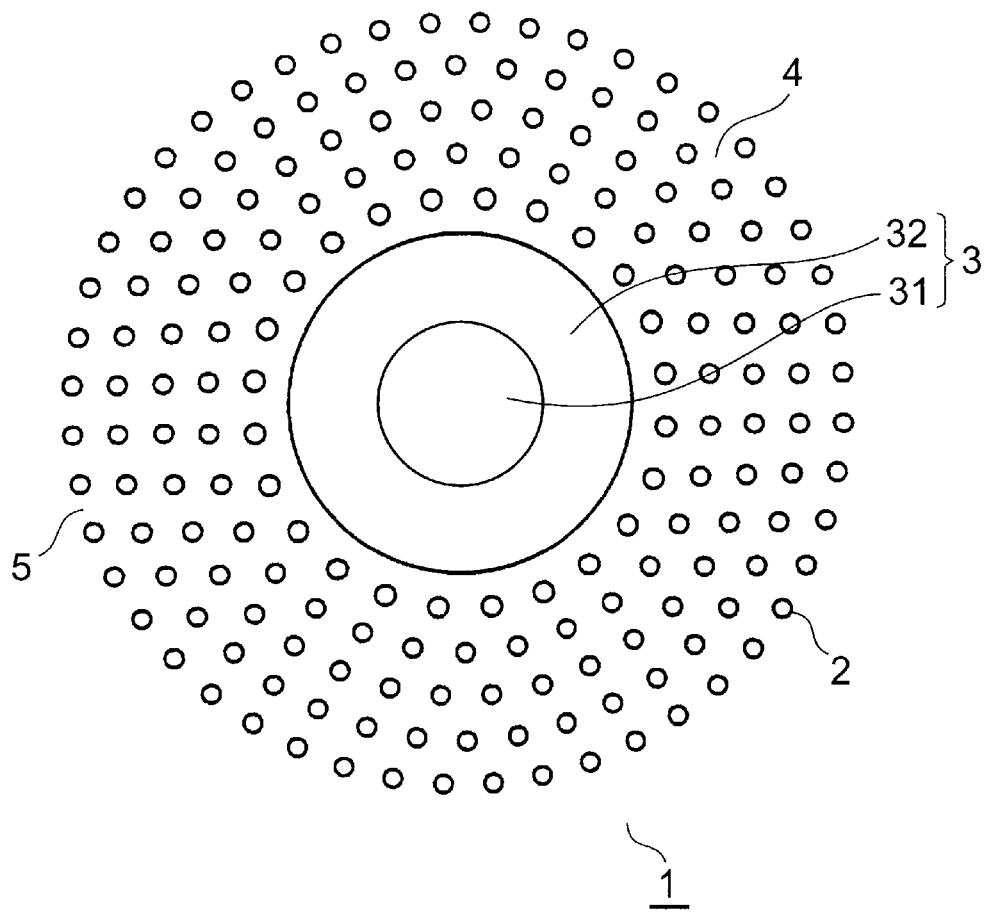
FIG. 7 is a cross-sectional view showing the structure of an optical fiber of the fourth embodiment.

Further as shown in FIG. 7, a core region 3 may consist of an inner core 31 and an outer core 32 which surrounds the inner core 31 and has the refractive index lower than that of the inner core 31 (hereinafter called "Fourth embodiment"). In the conventional optical fiber based on total internal reflection, optical properties such as chromatic dispersion and effective core area are restricted by bending loss. In the present embodiment, light is confined to the inner core region 31 due to total internal reflection between the inner core 31 and the outer core 32. Further, the regularity in the radial profile of the mean refractive index in the cladding 5 prevents light from leaking to the outside of the fiber, so that the bending loss can be reduced compared with an optical fiber which consists of only the core region 3 (an optical fiber in which the outer core 32 corresponds to a cladding region). As a result, the range of optical fiber characteristics which can be realized is broadened. Further, although reduction in bending loss of the fundamental mode often accompanies degradation in the cut-off characteristics of higher modes, according to the optical fiber of this embodiment, since the reflectivity of the cladding region has mode-selective characteristics, by designing the cladding structure so that the light of the fundamental mode is selectively reflected, the bending loss of the fundamental mode can be reduced without degrading the cut-off characteristics of higher order modes.

Further, in the optical fiber of the present invention, when the light has a wavelength at which the pseudo quarter wavelength condition is not satisfied is not reflected by the cladding region, so that the light leaks through the cladding region to the outside and hence is not guided along the fiber length. Accordingly, the optical fiber of this invention can be used as an optical filter which transmits only the light having the wavelength at which the pseudo quarter wavelength condition is satisfied, that is, the light in the reflection wavelength band.

The above mentioned pseudo quarter wavelength condition is a condition under which the cladding region most efficiently reflects lightwave, and there exists a wavelength where the condition is satisfied best and the reflectivity is maximized. As the wavelength of the light deviates from such a wavelength, the reflectivity of the cladding decreases, and the leakage loss increases. Such a characteristics can be used for realizing a wavelength-dependent transmission loss. In a wavelength division multiplexing optical communication, the wavelength dependent transmission loss can be used as a gain equalizer which minimizes the difference in the optical powers between wavelength channels. Accordingly, an optical communication of a large capacity and a long distance can be realized.

Further, in the optical fiber of the present invention, in the vicinity of the edges of the reflection wavelength band, large chromatic dispersion can be realized and the sign of the chromatic dispersion is different between two edges of the reflection wavelength band, and hence the positive or negative chromatic dispersion can be realized in a given wavelength band. Accordingly, by constituting an optical transmission path comprising of this optical fiber and an optical fiber which has chromatic dispersion of the opposite sign, it becomes possible to compensate for the dispersion of the optical transmission path. Accordingly, an optical transmission path having a small total chromatic dispersion and a large transmission capacity can be realized.

As has been described heretofore, according to the present invention, large mean refractive index difference can be obtained and, at the same time, high reflectivity in the cladding can be realized. Although the optical fiber of the present invention is similar to the conventional full PBG optical fiber in that the optical fiber has the voids and uses Bragg reflection, the optical fiber of the present invention remarkably differs from the conventional full PBG optical fiber in that the arrangement of voids does not have the translational symmetry. Since the optical fiber of the present invention does not have translational symmetry, the range of the realizable value of the core diameter is broadened. As a result, the number of the guided modes and the degree of optical confinement of the guided mode can be controlled in a wide range. Further, by choosing silica glass as the main medium and a gas or vacuum state as the sub medium, it becomes possible to fabricate optical fiber to a long length and with a good uniformity compared with the conventional technique.

What is claimed is:

1. An optical fiber consisting of a core region and a cladding region which surrounds said core region and has a plurality of regions spaced apart in cross section and made of sub mediums, whose refractive indices differ from that of a main medium constituting said cladding region, wherein said core region has lower mean refractive index than that of said cladding region, and wherein:

the arrangement of said regions made of sub mediums has such a regularity in the radial direction of said optical fiber that the light with given wavelength, propagation coefficient and electric field distribution propagates along the fiber axis and has not less than 50% of its total propagating power in said core region, and said arrangement does not have translational symmetry in cross section.

2. An optical fiber according to claim 1, wherein said regions made of sub mediums are substantially arranged on one or more concentric circumferences centered at the fiber axis in the cross section of the fiber.

3. An optical fiber according to claim 1, wherein said cladding region consists of a plurality of concentric cylindrical regions, where regions having high and low mean refractive indices are arranged alternately in the radial direction.

4. An optical fiber according to claim 3, wherein the optical thicknesses of said respective cylindrical regions effectively equal to the quarter wavelength of the given mode optical wave.

5. An optical fiber according to claim 1, wherein said main medium is silica glass and said sub medium is gas or vacuum.

6. An optical fiber according to claim 1, wherein said core region is a void.

7. An optical fiber according to claim 1, wherein said core region is made of silica glass.

8. An optical fiber according to claim 1, wherein said core region is made of optical gain medium.

9. An optical fiber according to claim 1, wherein said core region is composed of an inner core region and an outer core region surrounding said inner core region and having a lower refractive index than that of said inner core region.

10. A band-pass optical filter composed of said optical fiber according to claim 1.

11. A gain equalizer composed of said optical fiber according to claim 1.

12. An optical transmission path including said optical fiber according to claim 1 and an optical fiber whose dispersion is of the opposite sign to this optical fiber.

* * * * *